Figure 2:
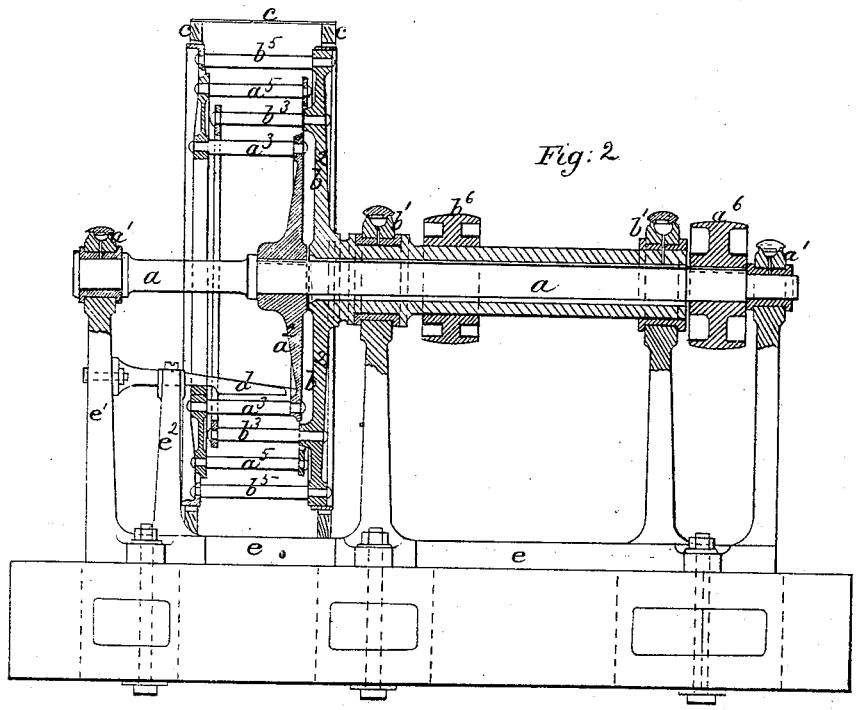

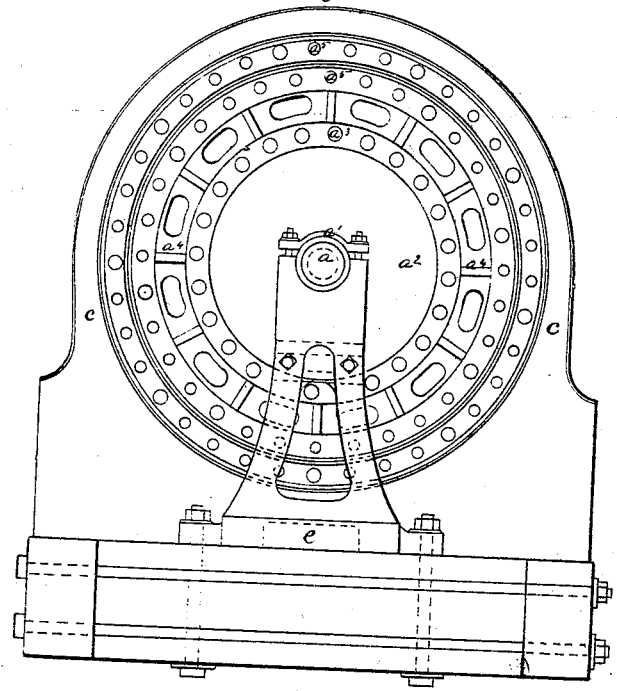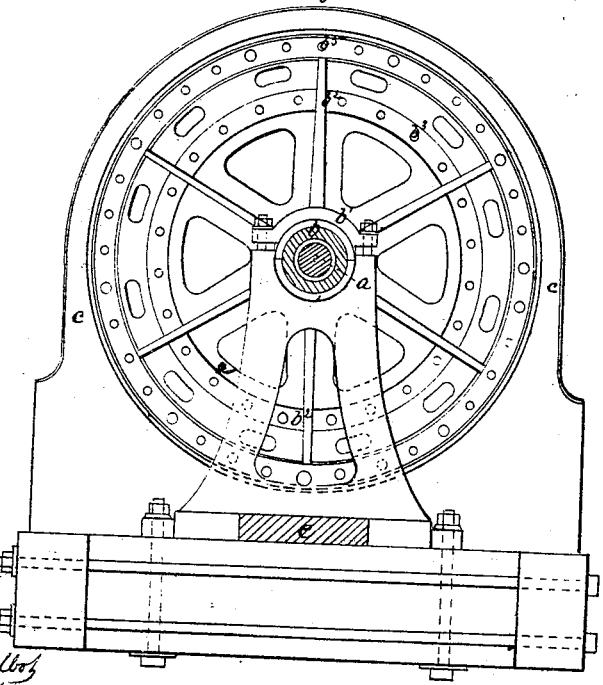

T. Carr.
Mixing Apparatus.
N° 91,085. Patented Jun. 8, 1869.

Witnesses
James S. Talbot
William Thompson

Inventor;
Thomas Carr

UNITED STATES PATENT OFFICE.

THOMAS CARR, OF BRISTOL, GREAT BRITAIN.

IMPROVED MACHINE FOR DISINTEGRATING FERTILIZERS AND OTHER ARTICLES OF MANUFACTURE.

Specification forming part of Letters Patent No. 91,085, dated June 8, 1869; patented in England October 2, 1868.

*To all to whom it may concern:*

Be it known that I, THOMAS CARR, of the city and county of Bristol, in the United Kingdom of Great Britain and Ireland, engineer, have invented new and useful Improvements in Machinery for Disintegrating, Dispersing, or Mixing Various Substances and Articles of Manufacture; and I do hereby declare the following to be a full, clear, and exact description of the same, reference being had to the accompanying drawings, and to the letters of reference marked thereon.

My improvements are made upon that machinery for disintegrating artificial manures and other substances, for which Letters Patent were granted to me for the United Kingdom of Great Britain and Ireland, known as "Carr's Disintegrator;" and the improvements to be hereinafter described are part of those for which Letters Patent have been applied for in the United Kingdom of Great Britain and Ireland, such application being numbered 3,235, and dated the 22d day of October, in the year of our Lord 1868.

In the ordinary disintegrator invented by me one set of cages is mounted upon a solid shaft, the two ends of which have bearings in plumber-blocks, and the other set of cages is mounted upon a hollow shaft which fits and rotates upon the solid shaft, and as the two shafts are driven at considerable speed in opposite directions the friction upon the hollow shaft is double that due to its own speed. Besides this objection, the brushes forming the bearing of the hollow shaft wear away rapidly, owing to the difficulty of keeping the lubricating matter within the shaft, and the result is excessive vibration in the cages, besides other minor defects; and one part of my improvements relates to one of the methods for obviating these difficulties, described in the provisional specification filed in application for my British patent; and consists, first, in mounting the solid shaft carrying one set of cages in plumber-blocks, as in the common disintegrator, and in mounting the hollow shaft carrying the other set of cages also in plumber-blocks concentric with the solid shaft, but not touching it. By this arrangement the bearings of both shafts can be tightened as required, and lubricating matter can be applied to both shafts when necessary, and while in motion.

Secondly, my improvements relate to an improved mode of holding the knife for breaking up the large lumps of material that will not pass through the inner cage when such knife is employed, and when a bed-plate with standards is used for carrying the plumber-blocks of the two shafts; and this part of my invention consists in using a short standard, from the base-plate close to the cages, to steady and hold the knife, the end of which is secured by bolts to the standard for the outer bearing.

Thirdly, my improvements relate to the cover or casing, which in the common disintegrator is made to inclose the entire cages, except the opening, to admit the material in front, the objection being that the material frequently gets caked between the ends of the cages and the cover; and this part of my improvements consists in arranging the cover so as to commence only at the outer edges of the cages, the inner edges of the cover coming in about a line with the inner edges of the cages, which are as close as possible to the cover, so as to run clear without touching.

The accompanying drawing shows three views of my improved machine, and a view of the base-plate or frame detached.

Figure 4:
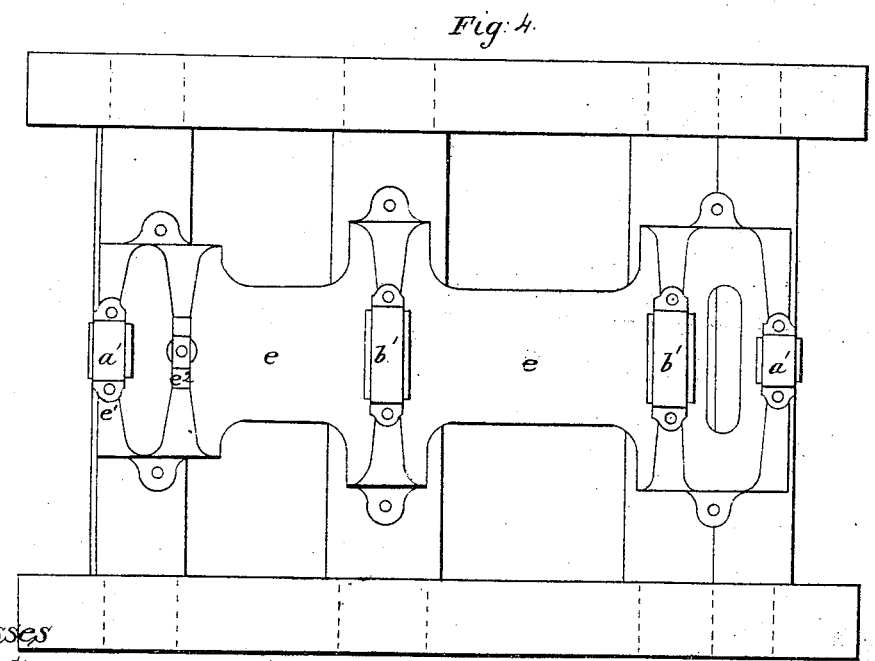

Figure 1 is a front elevation, being that end at which the machine is fed. Fig. 2 is a longitudinal elevation in section, only two bars in each cage being shown to avoid confusion; and Fig. 3 is a back elevation of the cages, the shafts immediately behind the cages being supposed cut away. Fig. 4 is a plan view of the base-plate or frame, shown by itself.

$a$ is a solid shaft in plumber-blocks $a^1$. This shaft has the inner disk, $a^2$, mounted upon it, which carries the bars $a^3$, forming the first or inner cage, and the outer ends of these bars carry the annular disk $a^4$, in which the bars $a^5$ of the third cage are secured.

$b$ is the hollow shaft in plumber-blocks $b^1$. Upon the end of this shaft the large outer disk, $b^2$, is cast, which carries the bars $b^3$ forming the second cage, and the bars $b^5$ forming the fourth or outer cage. The ends of the bars forming the second, third, and fourth cages are collected in hoops to give strength, as is well understood.

$c$ is the improved cover for the cages. $d$ is the knife for breaking up large lumps. It is bolted to the outside standard, $e^1$, and is steadied and held by the short standard $e^2$, rising from the base or frame $e$.

The driving-pulleys $a^6$ and $b^6$ may be both placed as shown in the drawing, or one, $a^6$, may be placed in front of the cages, or both may be placed in front of the cages, the hollow shaft in this case being connected with the inner disk, $a^2$.

I do not claim mounting the solid shaft $a$ in plumber-blocks, with the hollow shaft $b$ rotating upon it; nor do I claim the fixing of the knife $d$ to the outer standard, nor the inclosing of the cages by a cover; but What I do claim as my invention, and desire to secure by Letters Patent, is—

1. The mounting of both the solid and hollow shafts of disintegrator-machines in separate bearings $a^1$ and $b^1$, as herein set forth.

2. The mode of fixing a knife, $d$, in disintegrator-machines, by means of an additional short standard, $e^2$, from the base-plate or frame $e$, as herein set forth.

3. The making of the cover $c$ for the cages in disintegrator-machines so as to commence only at the outer edges of the outer cage, as herein set forth.

In testimony whereof I have signed my name to this specification in the presence of two subscribing witnesses.

THOMAS CARR.

Witnesses:
JAMES S. TALBOT,
WILLIAM THOMPSON.